United States Patent
Bakos

(10) Patent No.: US 7,290,971 B2
(45) Date of Patent: Nov. 6, 2007

(54) SHIPPABLE IN-ASSEMBLY BOLT

(75) Inventor: Peter L. Bakos, Barrington, IL (US)

(73) Assignee: Okabe Co., Ltd., Vernon Hills, IL (US)

( * ) Notice: Subject to any disclaimer, the term of this patent is extended or adjusted under 35 U.S.C. 154(b) by 0 days.

(21) Appl. No.: 10/794,750

(22) Filed: Mar. 5, 2004

(65) Prior Publication Data

US 2005/0196251 A1    Sep. 8, 2005

(51) Int. Cl.
*F16B 35/04* (2006.01)
*F16B 19/00* (2006.01)
*F16B 39/34* (2006.01)
*F16B 21/18* (2006.01)

(52) U.S. Cl. .............. 411/304; 411/353; 411/352; 411/999; 411/970; 411/174; 411/383

(58) Field of Classification Search ......... 411/304, 411/352, 353, 999, 970, 172–174, 383
See application file for complete search history.

(56) References Cited

U.S. PATENT DOCUMENTS

| | | | | |
|---|---|---|---|---|
| RE23,878 E | * | 9/1954 | Burdick | 411/304 |
| 3,144,066 A | * | 8/1964 | Hecke | 411/304 |
| 3,182,702 A | * | 5/1965 | Nason et al. | 411/304 |
| 3,221,794 A | * | 12/1965 | Acres | 411/353 |
| 3,638,980 A | * | 2/1972 | Kleinhenn | 411/320 |
| 3,770,036 A | * | 11/1973 | Sherman | 411/508 |
| 3,777,358 A | * | 12/1973 | Matievich et al. | 29/450 |
| 4,023,373 A | * | 5/1977 | Hipkins | 405/259.6 |
| 4,195,547 A | * | 4/1980 | Giannuzzi | 411/54 |
| 4,701,088 A | * | 10/1987 | Crull | 411/369 |
| 4,710,082 A | * | 12/1987 | Curtis | 411/373 |
| 5,315,952 A | * | 5/1994 | Jackson, Jr. | 114/312 |
| 5,381,606 A | * | 1/1995 | Solimar | 34/585 |
| 5,431,075 A | * | 7/1995 | Cruz et al. | 81/492 |
| 5,518,768 A | | 5/1996 | Wallace et al. | |
| 5,651,824 A | | 7/1997 | Wallace et al. | |
| 5,908,277 A | * | 6/1999 | Richards | 411/361 |
| 6,183,477 B1 | * | 2/2001 | Pepper | 606/104 |
| 6,279,435 B1 | * | 8/2001 | Zayat, Jr. | 81/440 |
| 6,296,431 B1 | * | 10/2001 | Miller | 411/353 |
| 6,688,823 B2 | * | 2/2004 | Kakamu et al. | 411/107 |
| 2004/0258501 A1 | * | 12/2004 | Swan | 411/383 |
| 2005/0201848 A1 | | 9/2005 | Reilly | |

OTHER PUBLICATIONS

FLOWSERVE™, "MSS for Piloted and Non-Piloted Models, Installation Instructions" revised Mar. 1992, downloadedfrom http://www.flowserve.com/seals/literature/fits130_mss.pdf, 12 pages.*

ND Stay-Put Temporary Retention Brochure, 2 pages, May 29, 2003.

* cited by examiner

*Primary Examiner*—Katherine Mitchell
(74) *Attorney, Agent, or Firm*—Mayer Brown LLP

(57) ABSTRACT

A shippable in-assembly bolt having a head portion, a threaded portion containing threads and a gripper portion, wherein the gripper portion preferably comprises a grooved structure and an o-ring. The o-ring is intended to sit between the inner wall of a clearance hole in an assembly/subassembly and the grooved structure of the gripper portion. When the o-ring is in position between the inner wall of the clearance hole and the grooved structure of the gripper portion, the o-ring is in both compression and tension and acts to retain the bolt in the assembly during shipping operations. The invention can be used with any type of mechanical fastener, such as bolts, screws, pins, rivets, etc.

19 Claims, 2 Drawing Sheets

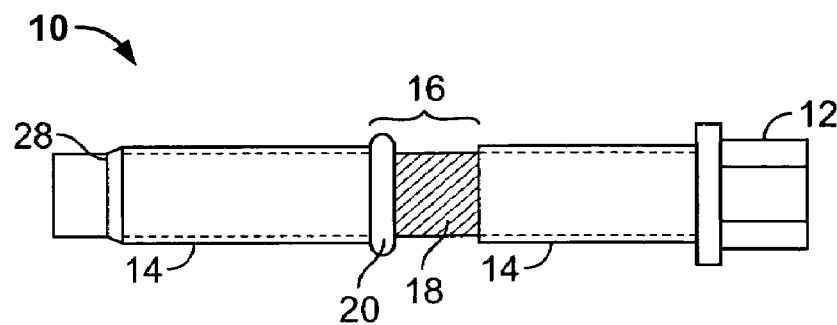
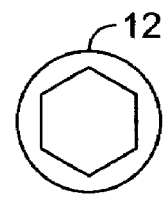
FIG. 1                    FIG. 2
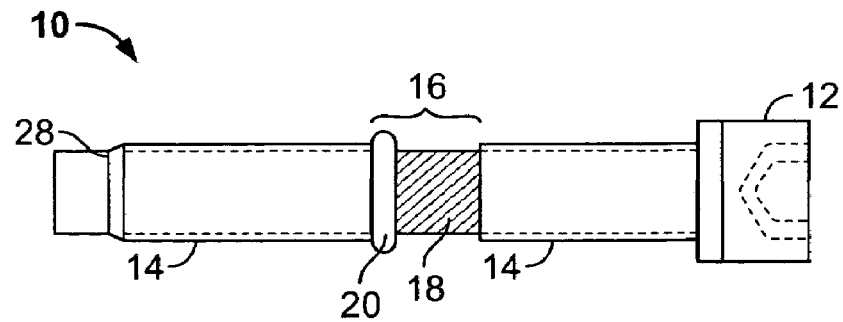
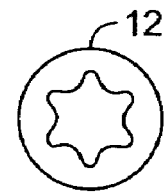
FIG. 3                    FIG. 4

SHIPPABLE IN-ASSEMBLY BOLT

FIELD OF INVENTION

This invention relates generally mechanical fasteners, and more particularly to fasteners, such as bolts, that can be used in shippable assemblies.

BACKGROUND OF INVENTION

In the manufacturing industry, and in particular manufacturing industries that rely on assembly lines, such as the automotive industry, it has become commonplace for automobile manufactures to assemble cars using modular assemblies/subassemblies (including, without limitation, housings, brackets, plates, panels, heads, blocks, rails, harnesses, frames, etc.) that are shipped to the automobile manufactures from outside vendors. Using modular assemblies/subassemblies allows the automobile manufacturer to increase productivity by reducing the amount of assembly that needs to occur at the manufacturing plant. In order to further facilitate the manufacturing process, it is common for modular assemblies/subassemblies to include the bolts or other fasteners that the manufacturer will use to attach the modular assembly/subassembly to another component in the automobile. These bolts are placed in their respective clearance holes in the modular assembly/subassembly before shipping to the manufacturer and thus eliminate the need for a line technician at the assembly plant to retrieve the appropriate-sized bolt and use it to connect the subassembly to the main assembly. Thus, using a modular assembly/subassembly with connecting bolts already in place allows the assembly plant to merely align the assembly/subassembly with its mating structure, advance the bolts by hand until the threads on the bolt and the threads in the mating structure engage and then use whatever tool is typically used to tighten the bolts (i.e., ratchets, pneumatic wrenches, screwdrivers, etc.).

A problem that has plagued manufactures of these modular assemblies/subassemblies that are shipped to automobile manufactures is that the bolts used to connect the modular assemblies to other mating components of the automobile very often fall out of their respective clearance holes due to the shipping process. Although bolt retention systems have been used by these manufacturers, such as polymer compositions extruded onto threads of a bolt, failures nonetheless occur, which is unacceptable to the automobile manufactures and can be costly to the particular vendor. Indeed, if an automobile manufacturer receives modular assemblies/subassemblies with missing or misplaced connecting bolts, such an occurrence could lead to the automobile manufacturer canceling a particular vendor's contract or, if such missing or misplaced bolts cause an assembly line to shut down, the automobile manufacturer can charge the vendor for the amount of money lost for the down time, which can be on the order of magnitude of $1000 per minute.

Besides the shipping process, which can cause severe oscillations that tend to cause shippable in-assembly bolts to fall out of their clearance holes, the bolt retention system must be chemically inert so that it maintains its retention properties in environments such as petroleum-based lubricants, which are common in the automotive field. A retention material that deteriorates in chemical environments typically found in these assemblies/subassemblies will invariable lose their retention properties, leading to failures of the retention system. Also, a retention material that is not chemically inert can cause the opposite effect and freeze the bolt (because the retention system bonds to the clearance holes in the assembly/subassembly) or increase the coefficient of friction, thus making it very difficult for a manufacturer to use the bolt and assembly/subassembly.

Because an assembly bolt will typically have to be advanced at least ¼ of an inch before the threads can engage, it is important that whatever retention system is used with in-assembly bolts not have axial forces that prevent an assembler from pushing the bolt within its clearance hole by hand to engage the threads. Also, due to efficiency concerns, a retention system must not need to be removed by an assembly worker prior to installation. In other words, the retention system must be able to remain in the assembly/subassembly for the life of the part without interfering with the operation of the assembly/subassembly or the automobile as a whole.

Accordingly, automobile manufacturers have demanded that manufactures of assemblies/subassemblies develop so-called shippable in-assembly bolts have certain minimum characteristics, namely that the bolts (i) remain in their respective assembly/subassembly clearance holes during shipment and subsequent handling; (ii) retain ease of installation with their mating assemblies or subassemblies; (iii) not contain any components that need to be removed prior to assembly with their respective assemblies or subassemblies; (iv) the bolt retention materials must be chemically inert with chemicals, adhesives, grease or other petroleum-based lubricants, or any other chemical used in the mating assembly/subassembly; (v) be compatible with hand assembly operations as well as semi-automated and automated assembly operations; and (iv) substantially maintain its axial retention and torsional force values for at least 30 days. Lastly, the retention system on the shippable in-assembly bolts must not be too expensive, otherwise the cost of the assembly/subassembly will not be palatable to the automobile manufacturer and/or the vendor will have to reduce its profit margins.

Accordingly, there is a need for a shippable in-assembly bolt that addresses the above identified problems. Other needs will become apparent based on a review of the specification, claims and drawings herein.

SUMMARY OF THE INVENTION

One embodiment of the invention comprises a shippable in-assembly bolt having a head portion, a threaded portion containing threads and a gripper portion, wherein said gripper portion preferably comprises a grooved structure and an o-ring. The o-ring is intended to sit between the inner wall of a clearance hole in an assembly/subassembly and the grooved structure of the gripper portion. When the o-ring is in position between the inner wall of the clearance hole and the grooved structure of the gripper portion, the o-ring is in both compression and tension and acts to retain the bolt in the assembly during shipping operations. The invention can be used with any type of mechanical fastener, such as bolts, screws, pins, rivets, etc.

BRIEF DESCRIPTION OF THE DRAWINGS

FIG. 1 is a side elevational view of a shippable in-assembly bolt of one embodiment of the present invention.

FIG. 2 is a top plan view of the shippable in-assembly bolt of FIG. 1.

FIG. 3 is a side elevational view of a shippable in-assembly bolt of one embodiment of the present invention.

FIG. 4 is a top plan view of the shippable in-assembly bolt of FIG. 3.

DETAILED DESCRIPTION OF THE PREFERRED EMBODIMENT

Figure 5:
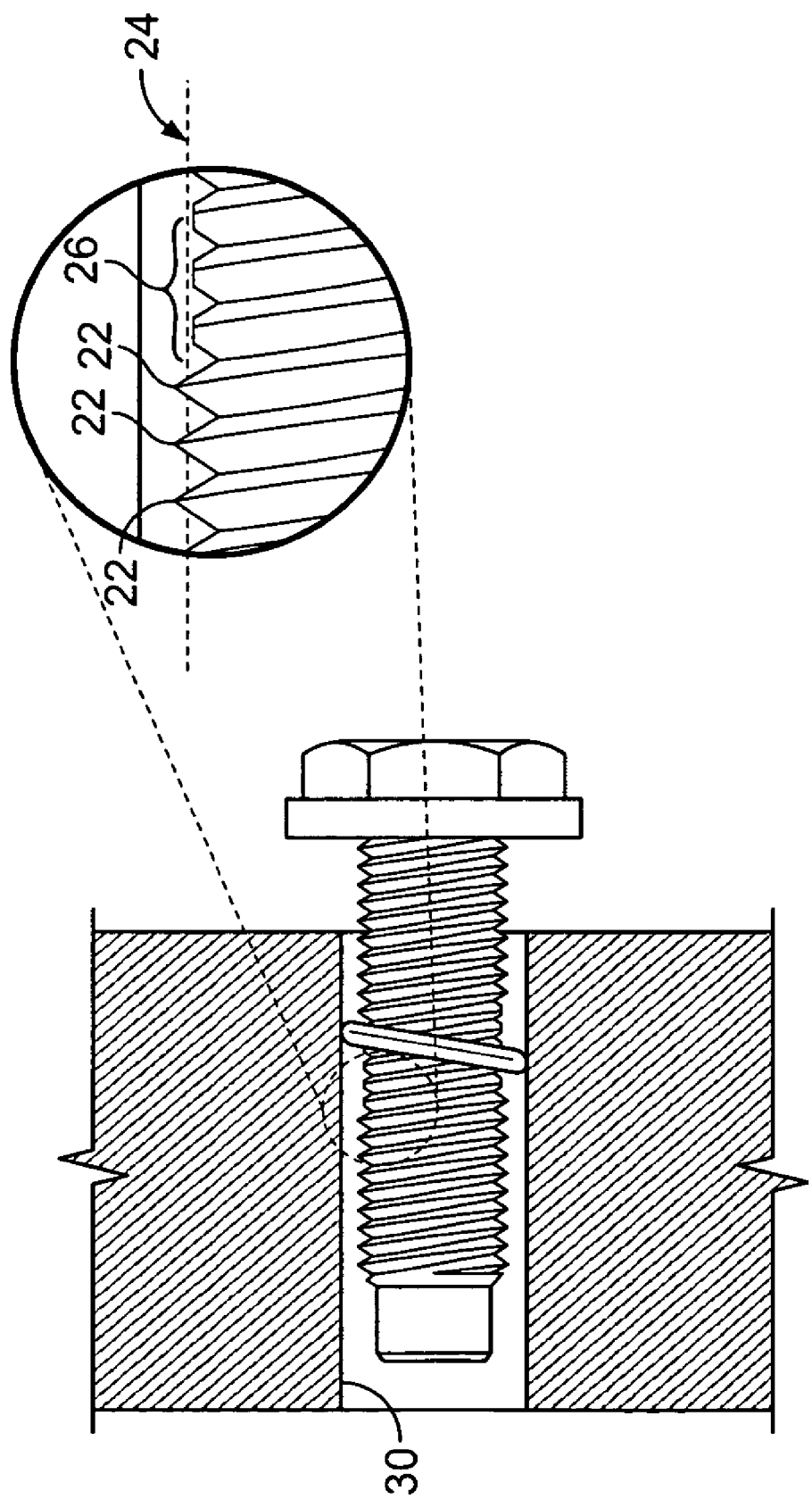
FIG. 5 is a cross-sectional side view of a shippable in-assembly bolt of one embodiment of the present invention when the bolt is placed within a clearance hole

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

With reference to FIGS. 1 and 2, there is shown a shippable in-assembly bolt 10 in accordance with one embodiment of the present invention. The bolt 10 comprises three main sections: a head section 12, a threaded section 14 and an in-assembly bolt retention system 16. In one embodiment of the present invention, the head section comprises a hex head with an integral washer. However, those with skill in the art will recognize that head section can comprise any structure that allows a tool to engage and turn the bolt 10, such as hex heads, torx heads, alien heads, phillips heads, slotted heads, etc. For example, a torx head structure is shown in FIGS. 3 and 4. Also, the head section need not be configured to be turned and tightened by a tool, but can instead have structures thereon that facilitate use of the bolt 10 using hand tightening and loosening techniques. In addition, the head section 12 need not contain an integrated washer, or any washer whatsoever. Thus, those will skill in the art will appreciate that the selection of head structures for head section 12 will vary depending on the intended use for the bolt 10.

Threaded section 14 comprises a metal shaft with threads preferably machined into the outside thereof. The threads can be of any type and will vary depending on the intended use for the bolt 10. The threads need not, however, be machined into the threaded section 14, but can also be cast, rolled or stamped into the threaded section, depending on the application that the bolt 10 will be used for.

In one embodiment of the present invention, the bolt retention system 16 comprises helical grippers 18 and an o-ring 20. The helical grippers are formed by taking a portion of the threaded section 14 and removing a portion of the crest 22 of the threads at approximately the pitch diameter 24 of the threads, as shown in FIG. 5. For simplicity, the removal of the portion of the crest can be done after the bolt 10 has been threaded. Thus, after the bolt 10 has been threaded by techniques known in the art, a portion of the crest can be removed by any technique, but preferably by using a form tool in a grinding and/or turning operation. However, it is within the scope of the invention that the threads and the helical grippers can be formed by a molding, rolling and/or stamping process without any subsequent machining steps.

After a portion of the crest 22 is removed, the remaining structure is a helical groove gripper structure 26 that is shallower than the helical grooves for the remainder of the threaded section 14. In other words, the distance from the root to the crest of the groove in the threaded section 14 is greater than the distance from the root to the crest of the groove in the helical grove gripper structure 26, thus creating a slotted structure when viewing the bolt 10 from the side, as shown in FIGS. 1, 3, and 5. Although a slotted structure is preferred in one embodiment of the present invention, it should be noted that is possible to use a non-slotted structure with the present invention. It should be noted that the term "crest" and "root" as used herein are intended to describe the top and bottom of a grooved structure, respectively, and is not intended to describe any shape of the crest and root structure. Accordingly,.the crest and root of the helical groove structure of the present invention can be rounded, flat, peaked, etc.

It should be noted that the in-assembly bolt retention system 16 need not contain a helical groove structure. Indeed any structure that has the capability of gripping the o-ring 20 can be used in the practice of the present invention. Thus, for example, a plurality of parallel, non-helical grooves, a knurled structure or any other type of irregular (i.e., non-smooth) surface structure can be used as a gripper structure instead of the helical grooves described above. Also, it is possible that a smooth surface could be used as a gripper structure, under the theory that the coefficient of friction between an o-ring and the smooth surface when placed under pressure will be sufficient to grip and stretch the o-ring as it is inserted into a clearance hole. However, in the practice of one embodiment of the present invention, it is preferred to use the helical groove structure as the gripper structure to reduce manufacturing costs because the helical grooves utilize the already existing thread structure in the bolt.

In one embodiment of the present invention, the gripper structure is ten (10) millimeters in length and begins approximately seventeen (17) millimeters from the distal tip 28 of the bolt 10. The distal tip 28 can be of any configuration, and in a preferred embodiment is a tapered shape to facilitate the threading of the bolt 10 into a mating structure. After the gripper structure is created, the o-ring 22 is placed in position by sliding the o-ring 20 over the distal tip 28 of the bolt 10 until the o-ring 20 sits at the beginning of the gripper structure 26, as shown in FIGS. 1 and 3.

In order to provide the desired chemical resistance to the retention system, it is preferred that o-ring 20 comprises a nitrile material, which is a copolymer of butadiene and acrylonitrile. In a preferred embodiment, nitrile o-rings manufactured by the Able O Rings and Seals™ Corporation of Toronto, Ontatrio, Canada are used. However, any other type of o-ring could be used with the o-ring 22 of the present invention that possesses the desired chemical inertness, as discussed above.

In the operation of one embodiment of the present invention, when the bolt 10 is placed in a clearance hole 30 (FIG. 5) of a modular assembly/subassembly, the o-ring 20 becomes twisted as it rolls between the walls of the clearance hole and the gripper structure 26. Also, as the bolt 10 is inserted the o-ring stretches and becomes elliptical due to the helical grippers 10, because the o-ring 20 tends to follow and sit within the roots 30 of the helical grippers. This stretching and twisting places the o-ring 20 in tension. Moreover, due to the fact that the clearance hole, by definition, is only slightly larger than the major diameter of the threads, the o-ring 20, which preferably has a diameter greater than the diameter of the clearance hole, is compressed. This compression acts to hold the bolt 10 in the assembly/subassembly clearance hole. Moreover, due to the fact that there is tension in the o-ring 20, as well as compression, there is a substantial elimination of sheering forces which could develop in the o-ring and therefore prevents any significant damage to the o-ring. Also, because the o-ring is placed in tension and compression as it is advanced in a clearance hole, the o-ring tends to flatten in one embodiment of the invention. As the o-ring become more flat, the insertion forces becomes less due to a lower coefficient of friction. However, if the bolt is reversed in axial direction (and begins to be extracted from the clearance hole), the o-ring tends to expand from its flattened state. Accordingly, as the bolt 10 is extracted from a clearance hole in one embodiment of the present invention, the coefficient of friction becomes greater and thereby leads to greater extraction forces than the insertion forces. Thus, in one embodiment of the present invention, the bolt 10 develops inversely proportional axial forces when the initial insertion direction of the bolt 10 in a clearance hole is reversed into an extraction direction.

In a preferred embodiment, 007 o-ring and helical gripper diameter of 7.1 mm on a M8×1.25–6 g thread profile was used. However, it will be appreciated that other size o-rings, gripper diameters and thread profiles can be used with the practice of the present invention, which those with skill in the art will recognize will depend on the particular application for the bolt 10. Also, as discussed above, other gripper structures other than a helical structure can be used with the practice of the present invention.

As will be appreciated, the bolt 10 of the present invention can be used with any type of assembly/subassembly in an automobile. One possible use for the bolt of the present invention is for axle and drive assemblies for automobiles. It will be appreciated, however, that the bolt 10 can also be used with assemblies/subassemblies in fields other than the automotive field. Indeed, the bolt 10 of the present invention can be used in any subassembly/assembly that requires connecting bolts to be included in the subassembly/assembly and remain in the assembly/subassembly during a shipping operation. Also, the present invention can be used with any type of mechanical fastener, and is not limited to use with bolts. Thus, the present invention can also be used with screws, pins, rivets, etc.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. An in-assembly fastener for insertion into a clearance hole in a part with which said fastener is to be shipped, said fastener comprising:
    a head section located at a first end of said fastener;
    a first threaded section of preselected diameter formed on said first end of said fastener;
    a second threaded section of preselected diameter formed on a second end of said fastener;
    a gripper section, located between first and second threaded sections, said gripper section having a preselected outer diameter less than the diameter of said threaded sections and having a preselected axial length;
    wherein said gripper section further comprises an irregular surface, said irregular surface structure having a helical groove structure that contains crest portions that are shallower than crest portions of said threaded sections; and
    an o-ring frictionally mounted on said gripper section, said o-ring having an outer diameter sized for insertion into a clearance hole with a diameter smaller than the outer diameter, wherein said o-ring outer diameter of said o-ring is selected to cause physical distortion of said o-ring in an axial direction along the length of said gripper section when said fastener is moved axially with respect to the clearance hole.

2. The in-assembly fastener of claim 1, wherein said o-ring comprises a nitrile material.

3. The in-assembly fastener of claim 1, wherein said head section contains a hex-head configuration.

4. The in-assembly fastener of claim 1, wherein said head section contains a torx-head configuration.

5. The in-assembly fastener of claim 1, wherein said threads have a pitch diameter and wherein said crest portions of said helical structure terminate at substantially the pitch diameter of said threads.

6. The in-assembly fastener of claim 1, wherein said o-ring comprises a chemically inert material.

7. The in-assembly fastener of claim 1, wherein said head section comprises a tool-engaging head structure selected from the group consisting of allen head, a Phillips head, and a slotted head.

8. The in-assembly fastener of claim 1, wherein said head section further comprises an integral washer.

9. An assembly comprising:
    at least one clearance hole used to connect said assembly to a mating assembly;
    a fastener partially located within said clearance hole, said fastener comprising:
        a head section located at a first end of said fastener;
        a first threaded section of preselected diameter formed on said first end of said fastener;
        a second threaded section of preselected diameter formed on a second end of said fastener;
        a gripper section located between first and second threaded sections, said gripper section having a preselected outer diameter less than the diameter of said threaded sections and having a preselected axial length; and
        an o-ring mounted on said gripper section, said o-ring having an outer diameter larger than the diameter of said clearance hole, wherein the Outer diameter of said o-ring is selected to cause physical distortion of said o-ring in an axial direction along the length of said gripper section when said fastener is moved axially with respect to said clearance hole;
    wherein said o-ring sits between said gripper section and an internal wall of said clearance hole and wherein said o-ring is in compression and tension.

10. The assembly of claim 9, wherein said assembly is a subassembly.

11. The assembly of claim 9, wherein said gripper section further comprises an irregular surface, said irregular surface having a helical structure that contains crest portions that are shallower than crest portions of said threaded sections.

12. The assembly of claim 11, wherein said threaded sections contain threads with a pitch diameter and said crest portions of said helical structure terminate at substantially the pitch diameter of said threads.

13. The assembly of claim 9, wherein said o-ring comprises a nitrile material.

14. The assembly of claim 9 wherein, said head section contains a hex-head configuration.

15. The assembly of claim 9, wherein said head section contains a torx-head configuration.

16. The assembly of claim 9, wherein said clearance hole is unthreaded.

17. The assembly of claim 9, wherein said o-ring comprises a chemically inert material.

18. The assembly of claim 9, wherein said head section comprises a tool-engaging head structure selected from the group consisting of allen head, a Phillips head, and a slotted head.

19. The assembly of claim 9, wherein said head section further comprises an integral washer.

* * * * *